United States Patent
Rakhmailov

[19]

[11] Patent Number: 6,145,296
[45] Date of Patent: Nov. 14, 2000

[54] GAS TURBINE ENGINE HAVING COUNTER ROTATING TURBINES AND A CONTROLLER FOR CONTROLLING THE LOAD DRIVEN BY ONE OF THE TURBINES

[75] Inventor: Anatoly Rakhmailov, Bataysk, Russian Federation

[73] Assignee: ALM Development, Inc., Washington, D.C.

[21] Appl. No.: 09/161,170

[22] Filed: Sep. 25, 1998

[51] Int. Cl.⁷ ...................................................... F02C 1/06
[52] U.S. Cl. ................... 60/39.162; 60/39.161; 60/39.2; 60/39.511
[58] Field of Search ............................ 60/39.161, 39.162, 60/39.7, 39.24, 39.511, 39.07

[56] References Cited

U.S. PATENT DOCUMENTS

| | | |
|---|---|---|
| 1,388,707 | 8/1921 | Heinze . |
| 1,868,143 | 7/1932 | Heinz . |
| 2,303,381 | 12/1942 | New . |
| 2,579,049 | 12/1951 | Price . |
| 2,784,551 | 3/1957 | Karlby et al. . |
| 2,821,067 | 8/1958 | Tartaglia . |
| 2,823,520 | 2/1958 | Spalding . |
| 3,209,536 | 10/1965 | Howes et al. . |
| 3,280,555 | 10/1966 | Charpentier et al. . |
| 3,287,904 | 11/1966 | Warren et al. . |
| 3,469,396 | 9/1969 | Onishi et al. . |
| 3,625,003 | 12/1971 | Liddle et al. ..................... 60/39.161 |
| 3,727,401 | 4/1973 | Fincher . |
| 3,751,911 | 8/1973 | De Tartaglia . |
| 3,775,974 | 12/1973 | Silver . |
| 3,826,084 | 7/1974 | Branstrom et al. . |
| 3,886,732 | 6/1975 | Gamell . |
| 3,971,209 | 7/1976 | de Chair . |
| 4,003,199 | 1/1977 | Bell, III et al. ..................... 60/39.161 |
| 4,024,705 | 5/1977 | Hedrick . |
| 4,277,938 | 7/1981 | Belke et al. . |
| 4,338,780 | 7/1982 | Sakamoto et al. . |
| 4,338,781 | 7/1982 | Belke et al. . |
| 4,549,402 | 10/1985 | Saintsbury et al. . |
| 4,991,391 | 2/1991 | Kosinski . |
| 5,054,279 | 10/1991 | Hines . |
| 5,201,796 | 4/1993 | Glinski et al. ..................... 60/39.161 |
| 5,473,881 | 12/1995 | Kramnik et al. . |
| 5,762,156 | 9/1970 | Bates et al. ..................... 60/39.181 |

FOREIGN PATENT DOCUMENTS

| | | |
|---|---|---|
| 0103370A1 | 3/1984 | European Pat. Off. . |
| 77 09399 | 10/1978 | France . |
| 2332698 | 1/1974 | Germany . |
| 2335594 | 8/1974 | Germany . |
| 2437990 | 2/1976 | Germany . |
| 2018641 | 10/1991 | Germany . |
| 1744290 | 6/1992 | Russian Federation . |
| 2052145 | 1/1996 | Russian Federation . |
| 2052145C1 | 1/1996 | Russian Federation . |
| 196452 | 4/1923 | United Kingdom . |
| 413697 | 7/1934 | United Kingdom . |
| 412970 | 1/1935 | United Kingdom . |
| 720436 | 12/1954 | United Kingdom . |
| 753652 | 7/1956 | United Kingdom . |
| 801281 | 9/1958 | United Kingdom . |
| 803994 | 11/1958 | United Kingdom . |
| 1435687 | 5/1976 | United Kingdom . |

*Primary Examiner*—Charles G. Freay
*Attorney, Agent, or Firm*—Hughes Hubbard & Reed LLP; Ronald Abramson; Peter Sullivan

[57] ABSTRACT

A gas turbine engine has a turbine mounted downstream of a compressor and a compressor turbine mounted downstream of the turbine for driving the compressor. The compressor turbine has a rotor disk that is mechanically coupled to the compressor and rotates in a direction opposite to the direction of rotation of the turbine rotor disk. A heat exchanger has a first circuit connected to the compressor turbine and a second circuit connected between the compressor and the turbine. An electric load for taking off a fraction of power produced by the compressor turbine includes an electric generator that is mechanically coupled to the compressor turbine. An electric load controller changes the fraction of power produced by the compressor turbine based on readings from the temperature sensor located in the engine.

13 Claims, 6 Drawing Sheets

GAS TURBINE ENGINE HAVING COUNTER ROTATING TURBINES AND A CONTROLLER FOR CONTROLLING THE LOAD DRIVEN BY ONE OF THE TURBINES

This application cross-references three copending U.S. patent applications, each of which was filed on Sep. 25, 1988, as U.S. patent application Ser. No. 09/161,104, 09/161,104 and 09/161,115, respectively, each of which copending U.S. applications is incorporated herein by reference.

The invention relates to the field of gas turbine engines, and more specifically, to gas turbines using an adjustable load feedback mechanism to control engine operating parameters.

BACKGROUND OF THE INVENTION

This invention concerns variable speed gas turbine engines of a type that can be especially useful for driving electric generators or vehicles and in other applications where it is preferred to have a moderate power output, small size and high response speed. The efficiencies of variable speed turbines vary according to a number of variables, including engine speed. In prior art gas turbines of this type, when the turbine speed decreases and the power output remains unchanged, such as in the case of where a vehicle travels up a slope, the compressor speed will rise, its power will increase, and much more fluid than necessary will be supplied to the turbine. The engine consequently becomes "overcooled", the cycle temperature drops, and contraction of metal parts occurs. As a result, turbine power output decreases, and efficiency is reduced.

When turbine speed remains unchanged, and the power output decreases, such as in the case of where a vehicle travels down a slope, compressor speed decreases to a great extent and the turbine experiences a shortage of fluid. The engine thus becomes "overheated," which poses risks to turbine engine components due to excessive metal overheating and expansion.

During overcooling, the compressor turbine has an excess of power that floods the turbine with fluid. During overheating, there is a shortage of power at the compressor turbine, and the turbine receives less fluid than it needs, which leads to overheating. Thus, temperature is a critical parameter to control in engines of this type.

Both phenomena have been counteracted by controlling fluid flow to the compressor turbine or by controlling fluid flow to the turbine. In both cases, such control is accompanied by losses. For example, the prior art counter-rotating gas turbine engine shown at RU 2,082,894 uses control vanes to control fluid flow to the turbine.

This prior art gas turbine engine is advantageous because it does not have controllable stator vanes of the turbine. This lack of controllable stator vanes makes the engine more economical, especially during variable operation conditions. This engine also has better acceleration characteristics. This gas turbine engine does, however, have drawbacks, because it is controlled by the compressor stator vanes. Controlling the engine in this way make the engine susceptible to temperature swings yield temperatures outside safe limits, especially at low speeds. This is a serious disadvantage in partial load applications, such as in vehicle applications where the partial load characteristics are critical. In addition, controlling fluid flow using mechanical devices such as vanes or throttles is inefficient because such devices yield high losses. Even if the control method efficiently keeps the temperature within safe limits, the overall efficiency of the engine is still rather low in view of the losses.

In addition to efficiency concerns, the mechanical device used to control gas flow will have high inertia. High inertia reduces engine responsiveness to operating parameters. High inertia is dangerous in this circumstance because the control device will not have time to increase fluid flow to the turbine if the temperature rises suddenly.

This disadvantage is eliminated in a gas turbine engine according to the invention as described below.

SUMMARY OF THE INVENTION

It is an object of the invention to provide a gas turbine engine of the abovedescribed type in which the fluid flow in the engine flow duct is controlled with minimum losses.

Another object of the invention is to provide a gas turbine engine that has a greater overall efficiency.

A further object of the invention is to improve gas turbine engine responsiveness to temperature changes.

The foregoing objects are accomplished through the design of a gas turbine engine having a turbine mounted downstream of a compressor and a compressor turbine mounted downstream of the turbine for driving the compressor. The compressor turbine has a rotor disk that is mechanically coupled to the compressor and rotates in a direction opposite to the direction of rotation of the turbine rotor disk. A heat exchanger has a first circuit connected to the compressor turbine and a second circuit connected between the compressor and the turbine. An electric load for consuming a fraction of power produced by the compressor turbine includes an electric generator that is mechanically coupled to the compressor turbine. The electric load controller varies the electric load consumed based on temperature reading from the engine, thus changing the amount of power produced by the compressor turbine. This load is varied in response to changes in temperature and other operating characteristics in order to hold such characteristics within desired ranges.

Other objects and advantages of the invention will become apparent from the following detailed description of preferred embodiments thereof and the accompanying drawings.

BRIEF DESCRIPTION OF THE DRAWINGS

Figure 1:
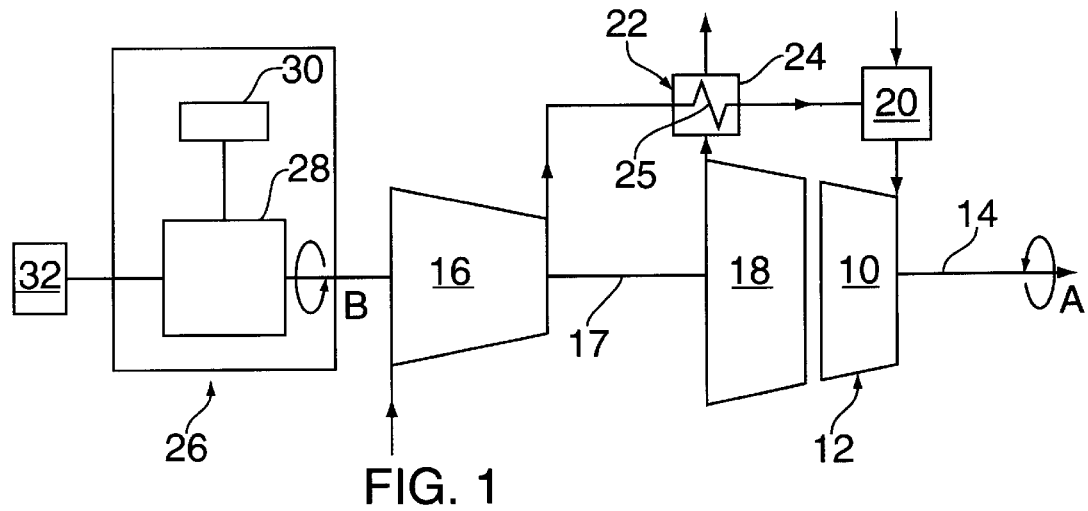
FIG. 1 is a schematic view of a gas turbine engine according to the invention.

In FIG. 1, a gas turbine engine has a turbine rotor disk 10 of a turbine 12 that is designed to produce output power.

Turbine rotor disk 10 has an output shaft 14 that rotates in the direction shown by arrow A to drive a useful load (not shown). Turbine 12 is mounted downstream of a compressor 16 for compressing fluid to supply fluid to turbine 12. Compressor 16 has a compressor turbine 18 that has a rotor disk (not shown) rotating on a shaft 17 in a direction shown by arrow B opposite to direction A. Fluid leaving turbine rotor disk 10 goes directly to the rotor of compressor turbine 18 without being subjected to any control.

A combustor chamber 20 is used to supply heated fluid to turbine 12. Fluid from compressor 16 is supplied to turbine 12 via a heat exchanger 22 that has a first circuit 24 connected to compressor turbine 18 and a second circuit 25 that is located between compressor 16 and turbine 12. The fluid that leaves heat exchanger 22 and goes to turbine 12 is heated by exhaust gases. The use of the heat exchanger is necessary to increase the thermal inertia of the fluid system in the gas turbine engine and to avoid abrupt temperature changes. According to the invention, an electric load 26 that includes a generator 28 is mechanically coupled to compressor turbine 18. Electric generator 28 preferably has its rotating part (rotor) installed directly on shaft 17. Although any electric generator can be used, it is preferred that electric generator 28 be of a high-speed type that can be mounted on, or directly coupled to shaft 17. Electric load 26 has an electric consumer 30. The electric load functions as a "brake" for compressor turbine 18, because when consumer 30 is connected to generator 28, power take-off from shaft 17 occurs, and the effective power output of compressor turbine 18 that drives compressor 16 will decrease. The effective power output of compressor turbine 18, hence the quantity of fluid that is fed to turbine 12, is thus decreased when power consumption from consumer 30 is increased. This control does not yield losses in the flow duct because generator 28 converts the mechanical power that is taken off from compressor shaft 17 into electric power that can be used by consumer 30. Power take-off has to be controlled for the operating conditions of turbine 12. This means that electric load 26 has to be controlled. A device 32 is provided for controlling electric load 26. Device 32 can be of any appropriate known type and should receive appropriate input data and output a control action to electric load 26.

Figure 2:
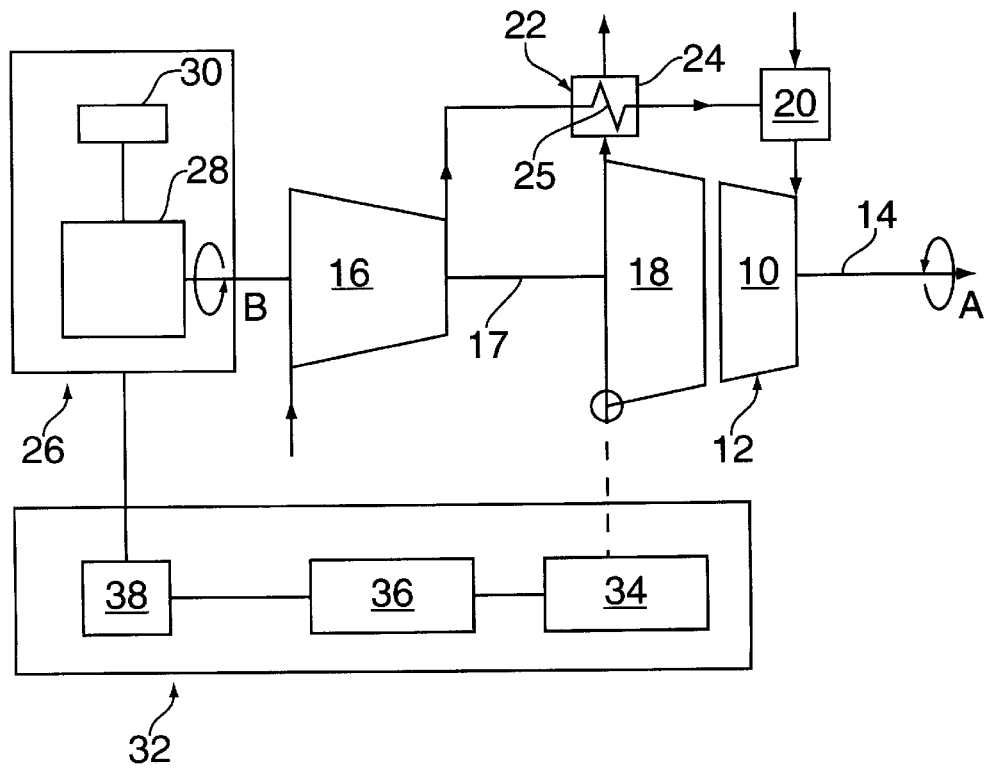
FIG. 2 is a schematic view of a gas turbine engine according to the invention, illustrating a control system.

In FIG. 2, where similar parts are shown at the same reference numerals as in FIG. 1, control means 32 has a temperature sensor, such as a thermocouple, that is mounted in compressor turbine 18 for measuring engine temperature. This thermocouple location was chosen because temperature is stable at the exhaust of the compressor turbine, but the temperature sensor can be located at any other convenient place where accurate temperature monitoring is possible. The temperature sensor preferably is mounted in the exhaust of the compressor turbine. Device 32 also has a controller 36, which has an input connected to temperature sensor 34. A controller of any type (analog or digital) can be used as long as it can store or generate a reference value for the temperature, receive the input signal from temperature sensor 34, compare it with the reference value, and produce an output signal based on the magnitude of the temperature difference. The output of controller 36 is connected to an actuator 38 that controls electric load 26. The actuator can be of any appropriate known type. Thus, if generator 28 is directly controlled, actuator 38 may be made as a control circuit of a generator excitation winding, such as a pulse generator or an amplifier, that is controlled by the output of controller 36. Actuator 38 can act upon electric consumer 30 to control the load on generator 28. In the simplest case, actuator 38 is a switch that can connect and disconnect consumer 30 with generator 28 according to a command from controller 36. Actuator 38 can be made as an SCR control circuit that will infinitely control voltage supplied from generator 38 to consumer 30 according to a command from controller 36.

While it is quite reasonable to control the gas turbine engine according to the invention by controlling engine temperature, using the controller and the temperature sensor as described above, it is understood that other systems can be used. The device for controlling said electric load can be made as a set of sensors for measuring gas turbine engine parameters and a processor for computing turbine power output and speed. The processor has inputs and an output, the inputs of the processor are connected to the set of sensors and the output of said processor is electrically coupled to the electric load. Any type of commercially available processor can be used.

The objectives and the mechanism of this control can be explained as follows with reference to FIG. 3, which shows a diagrammatic view of a part of the turbine rotor disk 10 and a part of the rotor disk of a counter rotating compressor turbine 18 of the gas turbine engine according to the invention.

In FIG. 3, the indicated symbols are defined as follows.

Ut is the velocity of the turbine rotor disk;

U is the velocity of the compressor turbine rotor disk;

V is the fluid velocity in turbine rotor disk 10;

V1 is the velocity of fluid leaving turbine rotor disk 10;

V2 is the velocity of fluid relative to compressor turbine rotor disk 10.

Figure 3A:
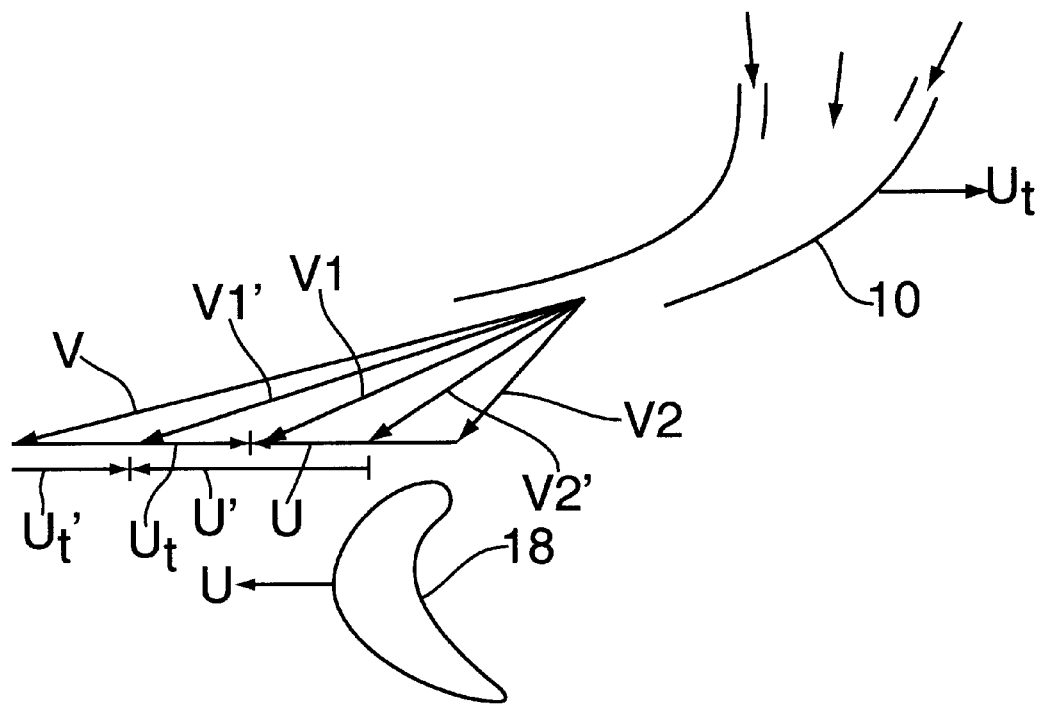
FIGS. 3 a and b shows diagrams of the velocity vectors illustrating various operation conditions of the gas turbine engine according to the invention.

In FIG. 3a, turbine 10 and compressor turbine 18 rotate in opposite directions (see velocities Ut and U). As circumferential velocity Ut decreases, velocity V1 increases and equals the velocity V1'(V1'>V1), with a change in fluid direction. As a result, the velocity V2 changes in direction and magnitude and equals V2'>V2. This change in direction and magnitude results in increased torque at compressor turbine 18. This increased torque increases compressor turbine power output, and the compressor turbine consequently supplies a greater quantity of fluid to turbine 10, overcooling the engine.

Figure 3B:
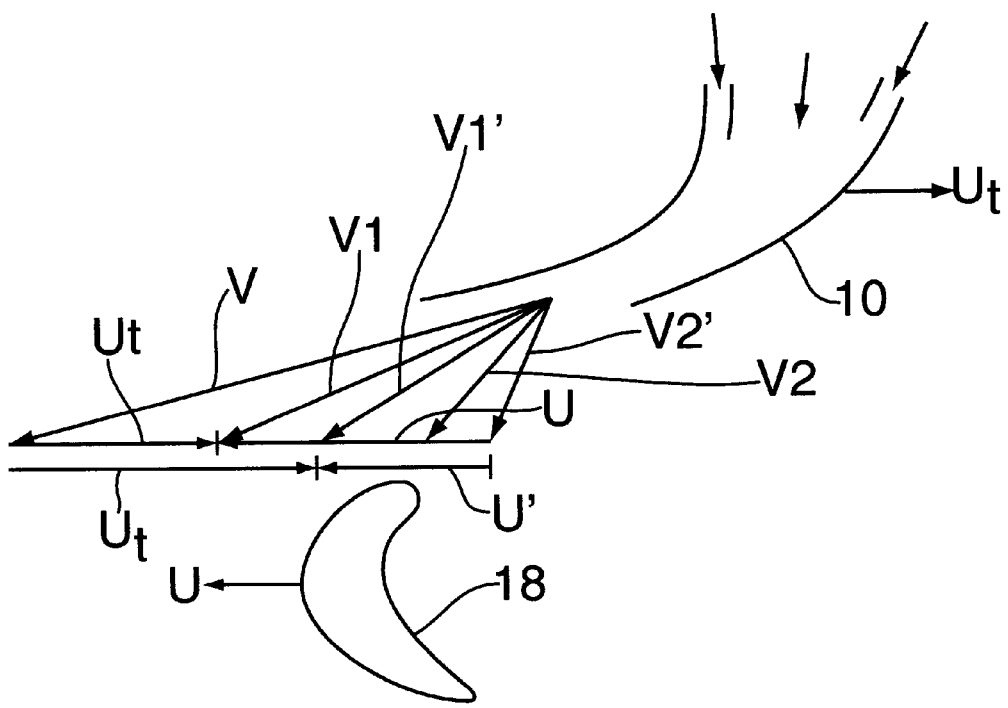

As can be seen in FIG. 3b, if the velocity Ut increases (Ut<Ut'), the velocity V1 decreases and equals the velocity V1'(V1 >V1'), with a change in direction. As a result, the velocity V2 changes in direction and magnitude and equals V2'<V2. A change in direction and magnitude results in decreased torque at compressor turbine 18. This decreased torque decreases compressor turbine power output, and the compressor turbine 18 consequently supplies less fluid to the turbine 10, leading to overheating.

The above-described control process in the gas turbine engine according to the invention solves these overcooling and overheating problems. When the gas turbine engine according to the invention consumes more fuel, such as in the application of a vehicle moving up a slope, the engine prevents "overcooling" by taking more power off the compressor turbine through electric load 26. This occurs because the temperature decrease in the compressor turbine (at thermocouple 34 in FIG. 2), triggers controller 36 to command actuator 38 to increase the load, either by boosting up the excitation system of generator 28 or by increasing the load of electric consumer 30. Where the vehicle moves down a slope, the above-described process reduces the electric load.

Figure 4:
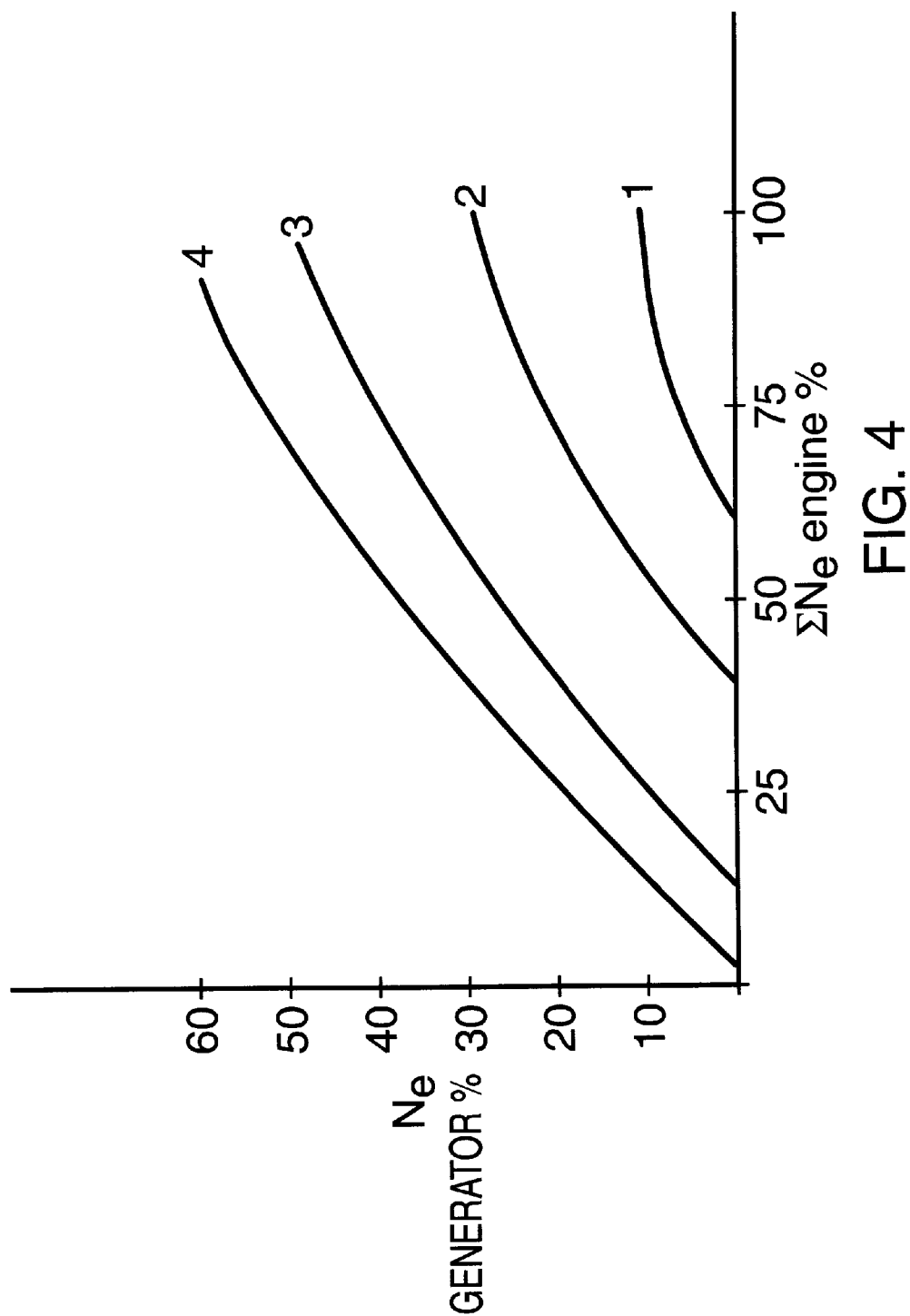
FIG. 4 is a chart showing relationship of the generator output vs. the total power output of the gas turbine engine.

Controlling power takeoff from the compressor turbine is illustrated in FIG. 4, which shows the relationship of generator output vs. total power output of the engine (the combined power output of the turbine and compressor turbine) for a given temperature. In FIG. 4, curves 1, 2, 3, and 4 correspond to 100% RPM, 75% RPM, 50% RPM, and 25% RPM, respectively, of turbine shaft 14 output. The compressor turbine power margin is always large. The gas turbine engine described here allows any quantity of fuel to be supplied without incurring a temperature change beyond safe limits. This feature provides this gas turbine engine with a very short response time. If the power output of the turbine is increased from 25% to 100% at 25% RPM (curve 4 in FIG. 4), the turbine speed remains the same. At the same time, there is a margin of power at the compressor turbine (about 60% of the turbine power output in this case), and this excessive power is taken off by the generator.

The compressor turbine should be sized in such a manner as to prevent any overheating conditions from occurring. This means that the compressor turbine will have a margin of power output sufficient to accommodate any potential increase in the turbine speed. The generator power output should be as high as one half of the compressor turbine power output. This will allow the generator (or the electric load) to take off enough power produced by the compressor turbine to keep the engine temperature within safe limits. There are gas turbine engines that have a starter mechanically coupled to the compressor turbine rotor for starting the gas turbine engine. When the gas turbine engine is started, the starter can be used as an electric generator. Such an application, however, is completely different from the application here because temperature in conventional gas turbine engines varies differently. When turbine power increases in these engines, compressor power also increases, thus keeping the temperature within safe limits. When the turbine power decreases, the process occurs in the reversed order. There is no need to control the compressor turbine power output in such gas turbine engines. For this reason, the starter/generator is sized to start the gas turbine engine and to support auxiliary power requirements (such as dashboard lighting, storage battery charging, etc.).

The power produced by the generator in limiting the speed of the compressor turbine can be channeled to a useful load. This may include: driving the wheels of the vehicle; supplying power to electric consumers; charging storage batteries. In the latter case, the vehicle can be a hybrid vehicle that can move by using the power stored in the storage batteries.

Figure 5:
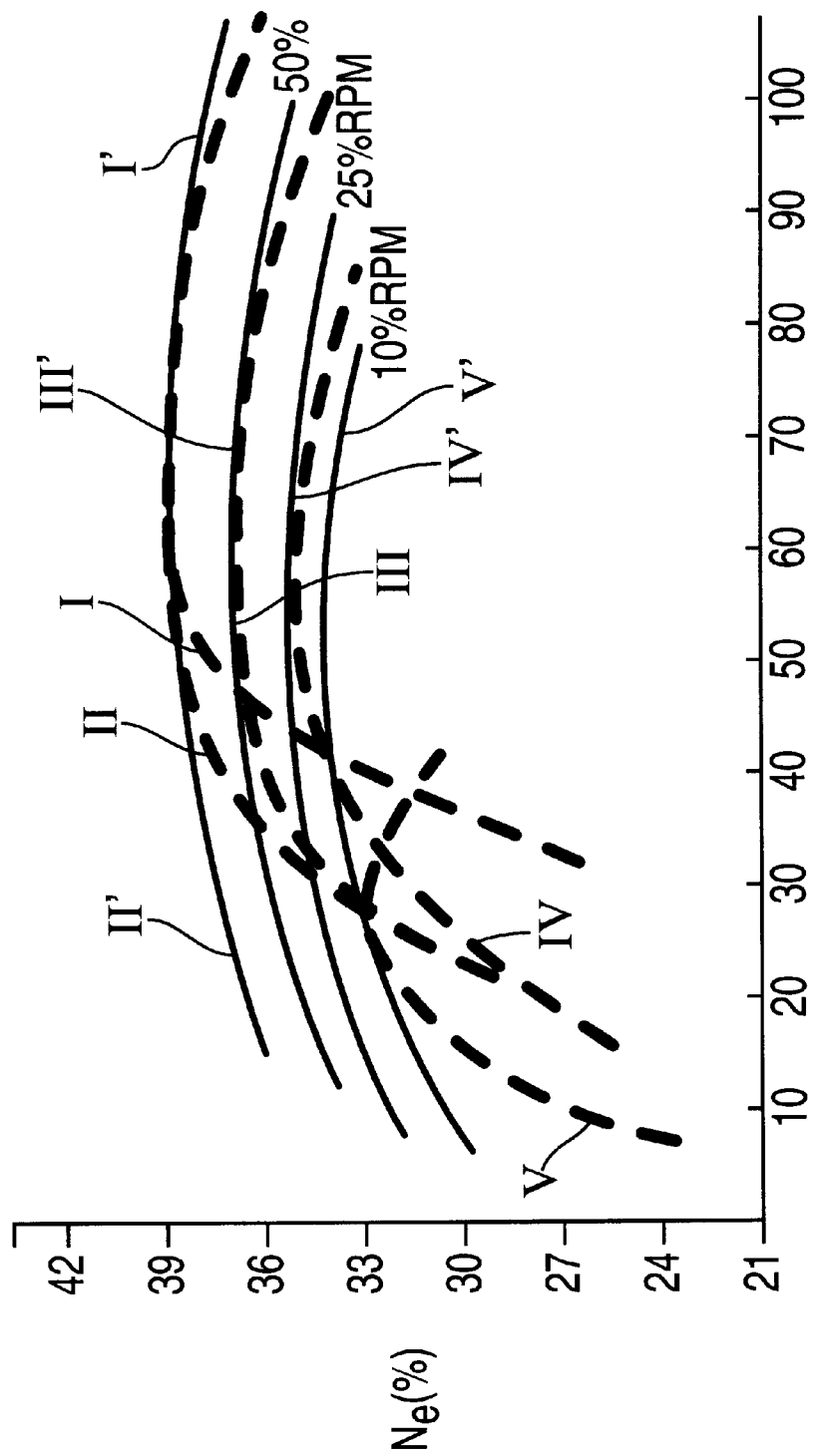
FIG. 5 is a chart showing efficiency vs. power for prior art and for the gas turbine engine according to the invention.

Since the power produced by the generator is channeled to a useful load, the overall efficiency of the engine is improved. This can be seen in FIG. 5 that shows efficiency vs. power for the prior art engine (curves I, II, III, IV, V) and for the gas turbine engine according to the invention (curves I', II', III', IV', V') for different RPM and power values. The different curves are given for 100% RPM, 75% RPM, 50% RPM, 25% RPM, and 10% RPM, respectively.

Figure 6:
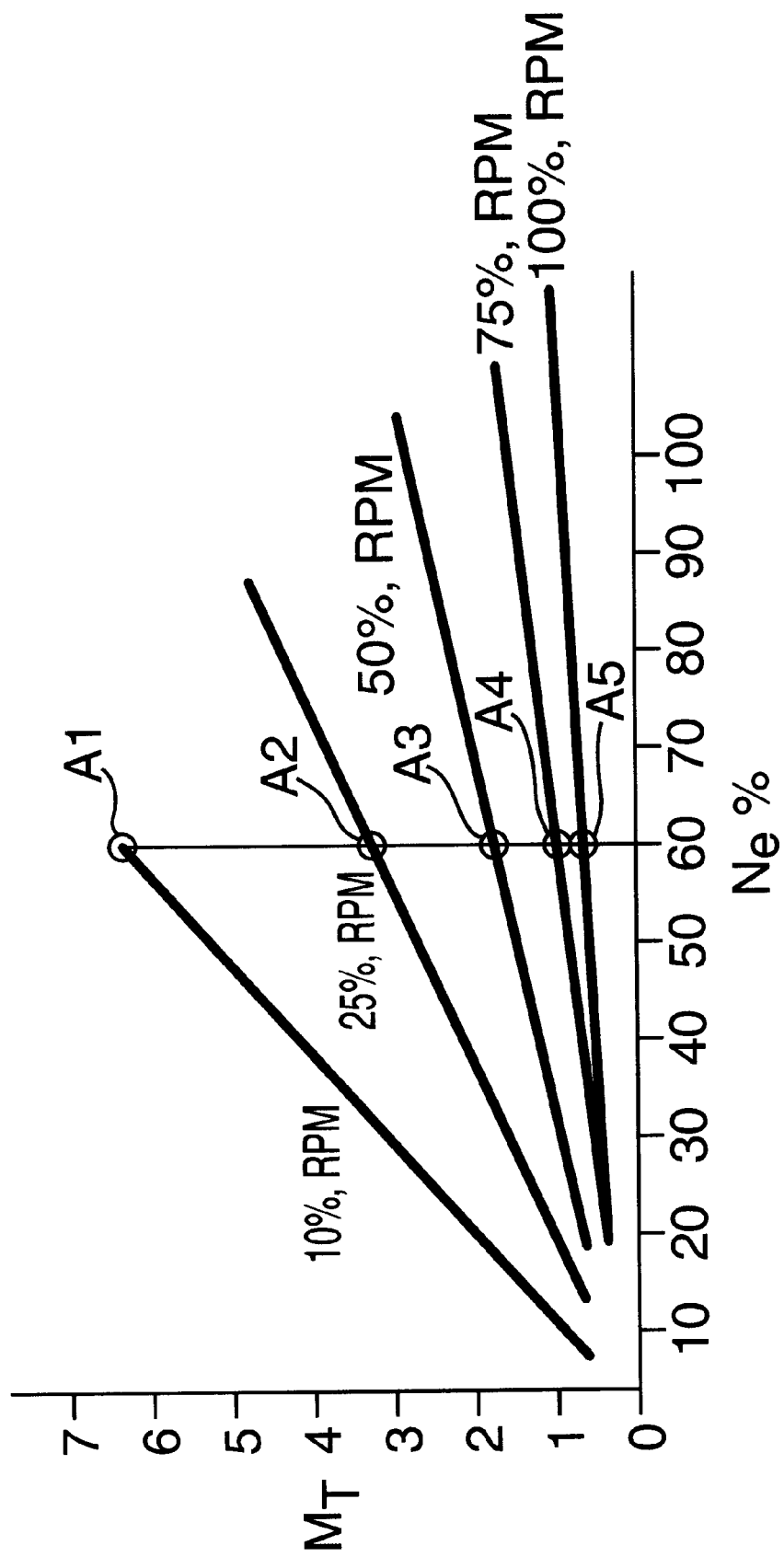
FIG. 6 is a chart showing a torque margin vs. the effective power output of the gas turbine engine according to the invention.

FIG. 6 shows a torque margin vs. the effective power output of the gas turbine engine at different RPM. With the effective power of about 60%, the engine speed decreases (points $A_5$ to A), with an increase in load but without an increase in the fuel supply rate. The torque rises with a decrease in the speed, thus the gas turbine engine according to the invention can be used without a transmission in vehicle applications.

The gas turbine engine described above incorporates electric load 26 with generator 28 for taking power off compressor turbine 18. Other types of loads, such as any hydraulic load, can be used instead of the electric load.

Figure 7:
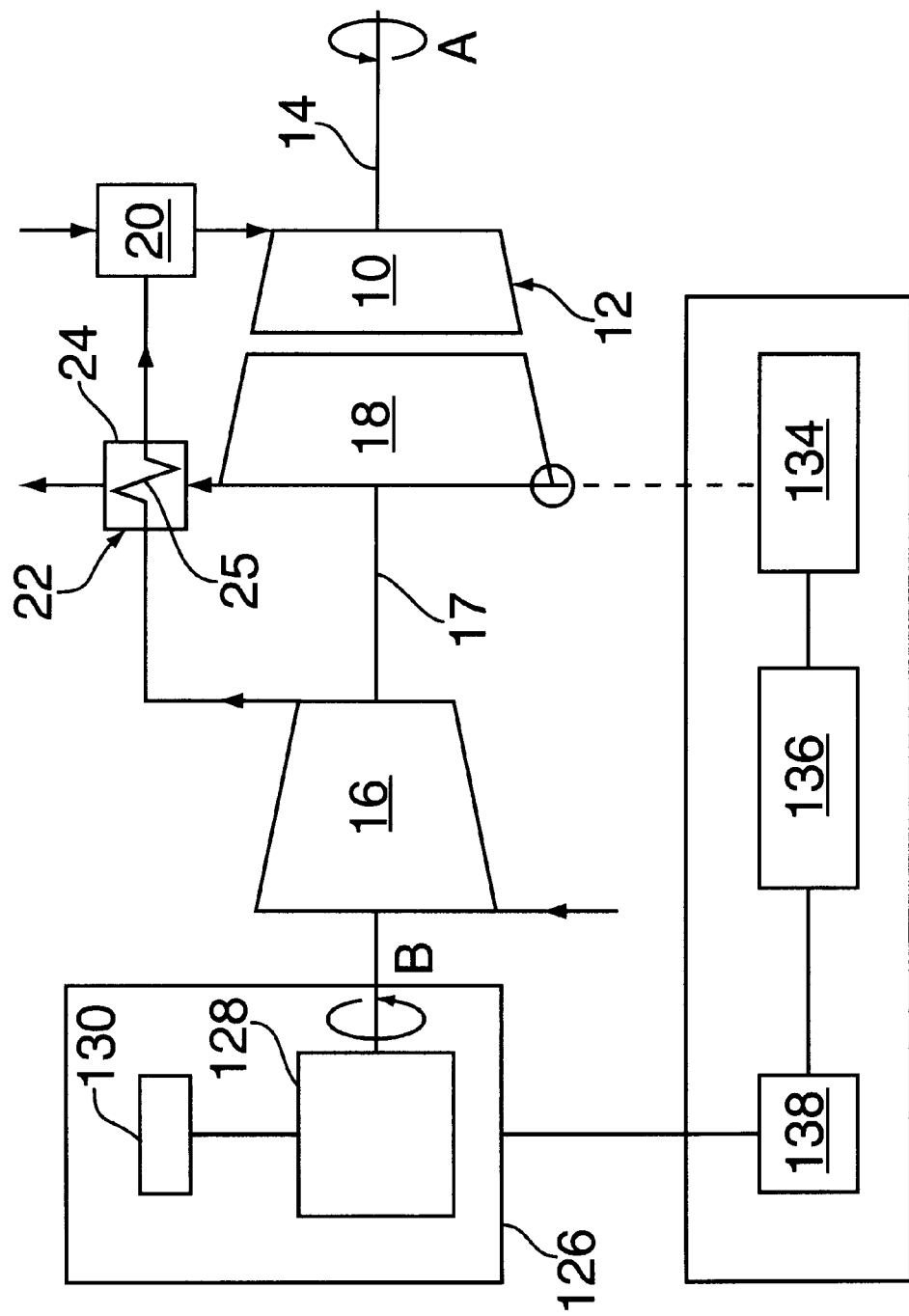
FIG. 7 is a schematic view of a gas turbine engine according to the invention, illustrating a control system with a hydraulic load.

FIG. 7 shows a gas turbine engine similar to that shown in FIG. 2, with the similar parts shown at the same reference numerals increased by 100. In this figure, the gas turbine engine has a hydraulic load 126 that includes a hydraulic pump 128. Hydraulic pump 128 is controlled in the same manner as described above by controller 136 and actuator 138. The hydraulic pump 128 can have a stroke adjustment mechanism or a speed adjustment mechanism controlled by actuator 138 to increase or decrease delivery of the hydraulic pump, hence to change the load on compressor turbine 118. The hydraulic pump can have a consumer 130 made as a hydraulic motor. Assuming that a second hydraulic pump can be provided at output shaft 114 of turbine 112, e.g., for driving various mechanism of a hydraulic excavator, the hydraulic power of hydraulic pump 128 can be used in addition to the hydraulic power of the main hydraulic pump mounted on output shaft 114 or for charging a hydraulic accumulator. The operation and advantages of the hydraulic system are similar to those of the gas turbine engine described in FIG. 2.

I claim:

1. A gas turbine engine, said gas turbine engine comprising:
 a compressor;
 a turbine having a turbine rotor disk, said turbine being mounted downstream of said compressor;
 a compressor turbine mounted downstream of said turbine for producing power for driving said compressor, said compressor turbine having a compressor turbine rotor disk, said compressor turbine rotor disk being mechanically coupled to said compressor to transmit said power to said compressor and said turbine rotor disk rotating in a direction opposite to the direction of rotation of said compressor turbine rotor disk;
 a heat exchanger having a first circuit connected to said compressor turbine and a second circuit connected between said compressor and said turbine;
 an electric load for taking off a fraction of said power produced by said compressor turbine, said electric load comprising an electric generator that is mechanically coupled to said compressor turbine; and
 a means for controlling said electric load.

2. The gas turbine engine of claim 1, wherein said means for controlling said electric load comprises a controller having an output that is electrically coupled to said electric load and an input, and at least one temperature sensor provided upstream of said heat exchanger, said temperature sensor being connected to said input of said controller.

3. The gas turbine engine of claim 2, wherein said controller is electrically coupled to said electric generator.

4. The gas turbine engine of claim 2, wherein said means for controlling said electric load comprises a set of sensors for measuring gas turbine engine parameters, a processor for computing turbine power output and speed, said processor having inputs and an output, said inputs being connected to said at least one sensor and said output of said processor being electrically coupled to said electric load.

5. A gas turbine engine, said gas turbine engine comprising:
 a compressor;
 a turbine having a turbine rotor disk, said turbine being mounted downstream said compressor;
 a compressor turbine being mounted downstream said turbine for producing power for driving said compressor, said compressor turbine having a compressor turbine rotor disk;
 said compressor turbine rotor disk being mechanically coupled to said compressor to transmit said power to said compressor;

said turbine rotor disk rotating in a direction opposite to the direction of rotation of said compressor turbine rotor disk;

a heat exchanger having a first circuit connected to said compressor turbine and a second circuit connected between said compressor and said turbine;

a hydraulic load for taking off a fraction of said power produced by said compressor turbine, said hydraulic load comprising a hydraulic pump that is mechanically coupled to said compressor turbine;

a means for controlling said hydraulic load, whereby said fraction of said power produced by said compressor turbine is controlled.

6. The gas turbine engine of claim 5, wherein said means for controlling said hydraulic load comprises a controller having an output and an input, a temperature sensor provided upstream of said heat exchanger, said temperature sensor being connected to said input of said controller, an actuator, said actuator having an input and an output, said input of the actuator being connected to said output of said controller and said output of said actuator being coupled to said hydraulic load.

7. The gas turbine engine of claim 6, wherein said hydraulic pump comprises a positive displacement pump having a stroke adjuster, said actuator being coupled to said stroke adjuster.

8. The gas turbine engine of claim 6, wherein said hydraulic pump comprises a centrifugal pump having a discharge control means, said discharge control means being coupled to said actuator.

9. The gas turbine engine of claim 6, wherein said hydraulic load comprises a hydraulic motor connected to said hydraulic pump, said hydraulic motor having a control device coupled to said actuator.

10. The gas turbine engine of claim 5, wherein said means for controlling said hydraulic load comprises a set of sensors for measuring gas turbine engine parameters, a processor for computing turbine power output and speed, said processor having inputs and an output, said inputs of said processor being connected to said set of sensors, an actuator, said actuator having an input and an output, said input of the actuator being connected to said output of said processor and said output of said actuator being coupled to said hydraulic load.

11. The gas turbine engine of claim 10, wherein said hydraulic pump comprises a positive displacement pump having a stroke adjuster, said actuator being coupled to said stroke adjuster.

12. The gas turbine engine of claim 10, wherein said hydraulic pump comprises a centrifugal pump having a discharge control means, said discharge control means being coupled to said actuator.

13. The gas turbine engine of claim 10, wherein said wherein said hydraulic load comprises a hydraulic motor connected to said hydraulic pump, said hydraulic motor having a control device coupled to said actuator.

* * * * *